(12) United States Patent
Baxter et al.

(10) Patent No.: US 10,358,901 B2
(45) Date of Patent: Jul. 23, 2019

(54) GEOLOGIC CONVERSION OF CARBON DIOXIDE TO HYDROCARBONS

(71) Applicants: Larry Baxter, Orem, UT (US); Nathan A. Davis, Bountiful, UT (US)

(72) Inventors: Larry Baxter, Orem, UT (US); Nathan A. Davis, Bountiful, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 0 days.

(21) Appl. No.: 15/644,222

(22) Filed: Jul. 7, 2017

(65) Prior Publication Data

US 2019/0010791 A1    Jan. 10, 2019

(51) Int. Cl.
| | | |
|---|---|---|
| *E21B 43/26* | (2006.01) | |
| *E21B 43/16* | (2006.01) | |
| *E21B 43/243* | (2006.01) | |
| *E21B 41/00* | (2006.01) | |
| *E21B 34/02* | (2006.01) | |

(52) U.S. Cl.
CPC ........ *E21B 43/164* (2013.01); *E21B 41/0064* (2013.01); *E21B 43/243* (2013.01); *E21B 43/26* (2013.01); *E21B 34/02* (2013.01)

(58) Field of Classification Search
CPC .. E21B 43/164; E21B 41/0064; E21B 43/243; E21B 43/26; E21B 34/02
USPC .......................................................... 166/261
See application file for complete search history.

(56) References Cited

U.S. PATENT DOCUMENTS

| | | | | |
|---|---|---|---|---|
| 2007/0261844 | A1* | 11/2007 | Cogliandro | ......... E21B 41/0064 166/248 |
| 2011/0174507 | A1* | 7/2011 | Burnham | ............ E21B 41/0064 166/402 |
| 2012/0003043 | A1* | 1/2012 | Cawley | ................. E21B 43/164 405/53 |
| 2013/0043678 | A1* | 2/2013 | Saar | ........................ F02C 1/005 290/2 |

* cited by examiner

*Primary Examiner* — Silvana C Runyan

(57) ABSTRACT

A carbon dioxide to hydrocarbon conversion device and method are disclosed. A partially produced hydrocarbon subterranean reservoir comprising residual hydrocarbons is provided. A carbon dioxide source is provided, positioned on a surface proximate to the reservoir. A surface mounted high-pressure fluid injector system connecting the carbon dioxide source and the reservoir is provided. A backflow preventer is disposed in-line between the injector system and the reservoir. The injector system injects a catalyst-free feed stream, comprising carbon dioxide, into the reservoir up to an operating pressure. The backflow preventer maintains the operating pressure in the reservoir and sequesters the feed stream in the reservoir. The sequestered carbon dioxide reacts with water and at least a portion of the residual hydrocarbons over a time period to produce additional hydrocarbons. The water is present in the reservoir, provided by the feed stream, or both. The additional hydrocarbons are recovered after the time period.

19 Claims, 6 Drawing Sheets

GEOLOGIC CONVERSION OF CARBON DIOXIDE TO HYDROCARBONS

This invention was made with government support under DE-FE0028697 awarded by The Department of Energy. The government has certain rights in the invention.

FIELD OF THE INVENTION

This invention relates generally to geological chemical conversion. More particularly, we are interested in the conversion of carbon dioxide to hydrocarbons utilizing geologic heating.

BACKGROUND

How to conduct effective carbon dioxide handling, sequestration, and conversion are important questions facing our world today. Solutions range from reduction of carbon dioxide produced in the first place, to storage underground, to catalytic conversion of carbon dioxide into hydrocarbons in processing plants. A solution that effectively sequesters and converts carbon dioxide simultaneously, without catalysts, is needed.

U.S. Pat. No. 7,562,708, to Cogliandro, et al., teaches a method and apparatus for capture and sequestration of carbon dioxide and extraction of energy from large land masses during and after extraction of hydrocarbon fuels or contaminants using energy and critical fluids. The present disclosure differs from this prior art disclosure in that the prior art disclosure does not convert the carbon dioxide to hydrocarbons. This prior art disclosure is pertinent and may benefit from the devices disclosed herein and is hereby incorporated for reference in its entirety for all that it teaches.

U.S. Pat. No. 7,077,199, to Vinegar, et al., teaches in situ thermal processing of an oil reservoir formation. The present disclosure differs from this prior art disclosure in that the prior art disclosure produces hydrocarbons through Fischer Tropsch synthesis, requiring carbon monoxide and catalysts. At no point does the prior art disclosure discuss conversion of carbon dioxide into hydrocarbons utilizing spent formations. This prior art disclosure is pertinent and may benefit from the devices disclosed herein and is hereby incorporated for reference in its entirety for all that it teaches.

SUMMARY

A carbon dioxide to hydrocarbon conversion device and method are disclosed. A partially produced hydrocarbon subterranean reservoir comprising residual hydrocarbons is provided. A carbon dioxide source is provided, positioned on a surface proximate to the reservoir. A surface mounted high-pressure fluid injector system connecting the carbon dioxide source and the reservoir is provided. A backflow preventer is disposed in-line between the injector system and the reservoir. The injector system injects a catalyst-free feed stream, comprising carbon dioxide, into the reservoir up to an operating pressure. The backflow preventer maintains the operating pressure in the reservoir and sequesters the feed stream in the reservoir. The sequestered carbon dioxide reacts with water and at least a portion of the residual hydrocarbons over a time period to produce additional hydrocarbons. The water is present in the reservoir, provided by the feed stream, or combinations thereof. The additional hydrocarbons are recovered after the time period.

The injector system may comprise a pump, a compressor, a pressurized pipeline, or combinations thereof. The backflow preventer may comprise a valve, a pump, a cap, a plug, or combinations thereof. The time period may comprise between 5 and 80 years. The operating pressure may be maintained periodically over the time period by further injecting the feed stream into the reservoir. The operating pressure may comprise a range between 200 bar and 600 bar and an operating temperature of the reservoir may comprise a range between 30 C and 100 C. The heat required for reaction may be provided by geothermal heating, combusting at least a portion of the residual hydrocarbons with oxygen added to the feed stream, preheating the feed stream, or combinations thereof.

The feed stream may further comprise water, oxygen, or combinations thereof. The hydrocarbons may comprise alkanes, cycloalkanes, alkenes, alkynes, aromatics, asphaltenes, other organic compounds, or combinations thereof.

The reservoir may be produced, at least partially fractured, be fractured by the operating pressure, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

The device and process described by the Figures herein converts catalyst-free feed streams into usable hydrocarbon streams. Geologic sources may be used as one potential energy input. This energy input could be called a geothermal source, but should not be confused with hotter than usual sources that go by the same name and are used for power generation. Rather, this geothermal source is the heat of the earth that essentially always increases with depth in conjunction with a hydrocarbon reservoir such as an oil or gas reservoir, including already produced oil and gas reservoirs with residual hydrocarbons. At high temperature and pressure, the equilibrium between feed and $H_2O$ increasingly favors condensed-phase hydrocarbons, which form by the reactions of residual hydrocarbons and water in the structure with the injected feed. Over time, the hydrocarbon liquid accumulates in the reservoir as these gases or supercritical liquids react. This hydrocarbon liquid can then be removed from the reservoir to be used in established markets. This establishes a cycle in which the $CO_2$ reacts with residual (and typically non-extractable) hydrocarbons and local water to form hydrocarbons. The high reservoir pressure shifts equilibrium in the chemical reaction with $CO_2$ toward products that occupy less volume. In the case of liquids, the volume reduction comes from the phase change. In the case of methane as a product, the volume reduction comes from converting several moles of reactants to fewer moles of products.

The term produced means that at least a portion of the hydrocarbons were previously removed. A synonymous term is depleted, i.e., hydrocarbons were produced and so the hydrocarbon reservoir was depleted.

Figure 1:
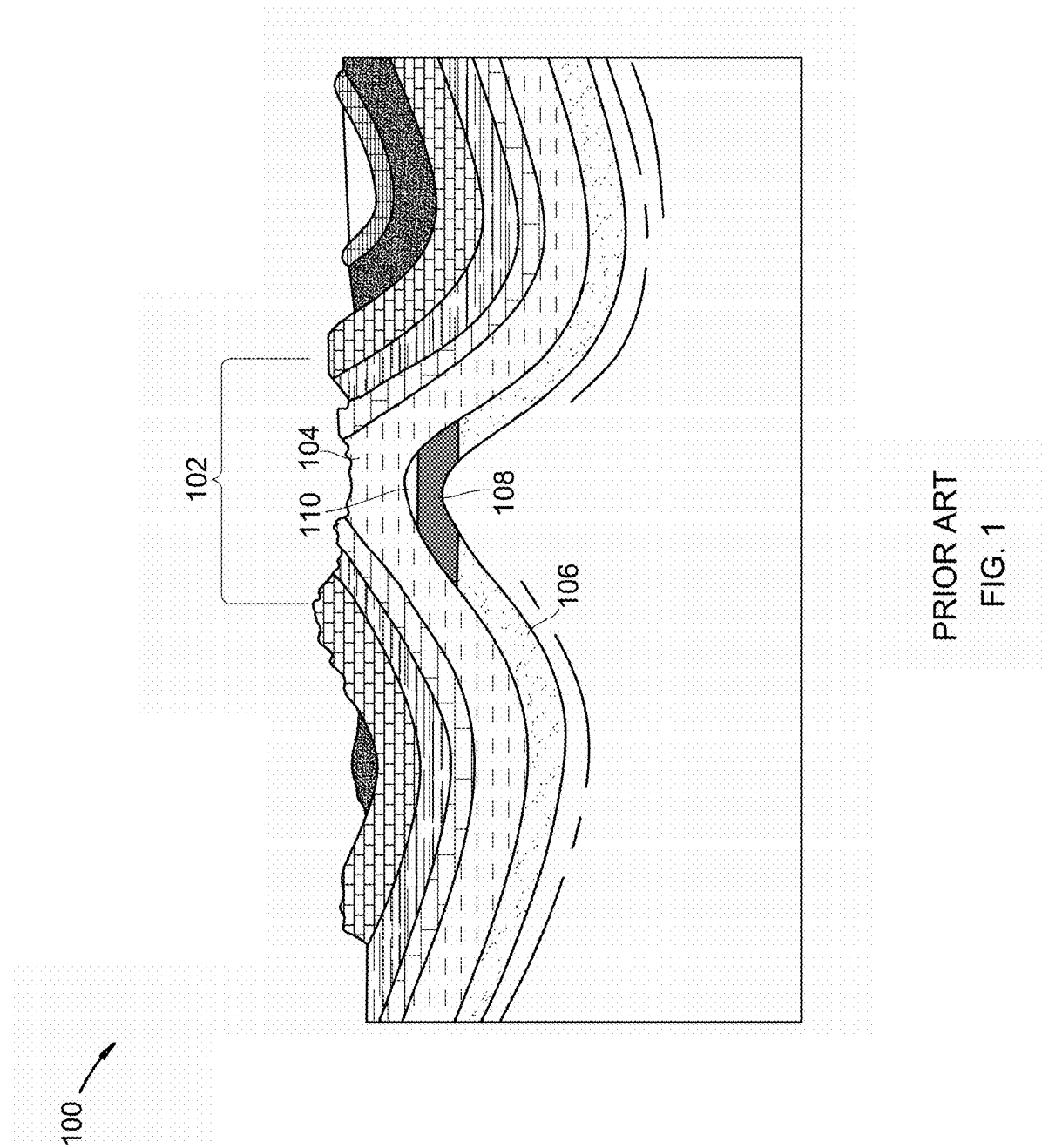
FIG. 1 shows an anticline with oil and gas reservoir, as per the Prior Art.

Referring to FIG. 1, an anticline with oil and gas reservoir is shown at 100, as per the Prior Art. Anticline 102 contains oil 108 and gas 110 capped by cap rock 104. Water 106 is contained in the reservoir rock. Removal of oil 108 and gas 110 from the reservoir would prepare the reservoir for use as a part of one embodiment of the present invention.

Figure 2:
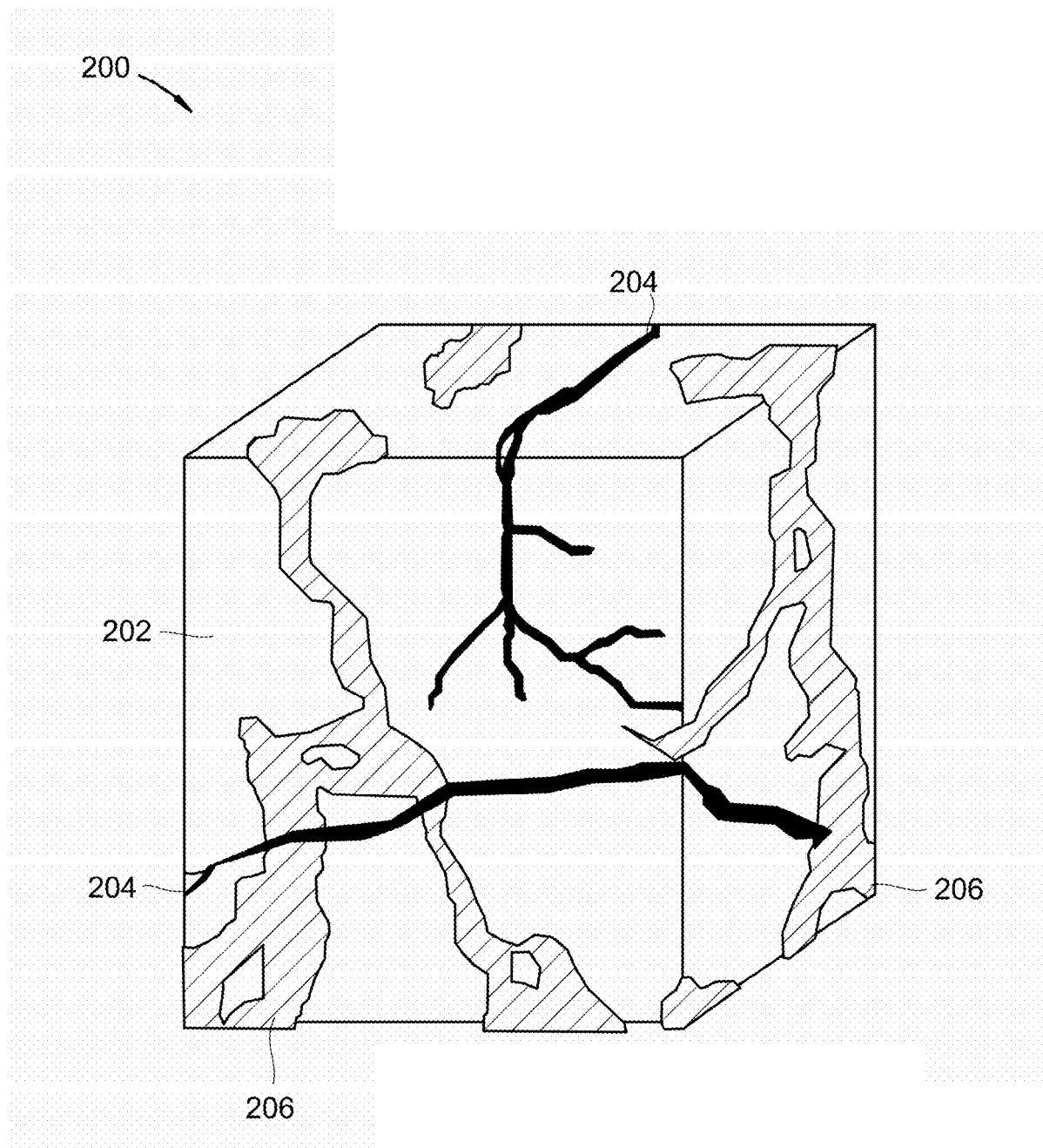
FIG. 2 shows a fractured reservoir, as per the Prior Art.

Referring to FIG. 2, a fractured reservoir is shown at 200, as per the Prior Art. Rock matrix 202 surrounds vugs 206 and fractures 204. Fractures 204 that contain residual hydrocarbons and water would be useable as a part of one embodiment of the present invention.

Figure 3:
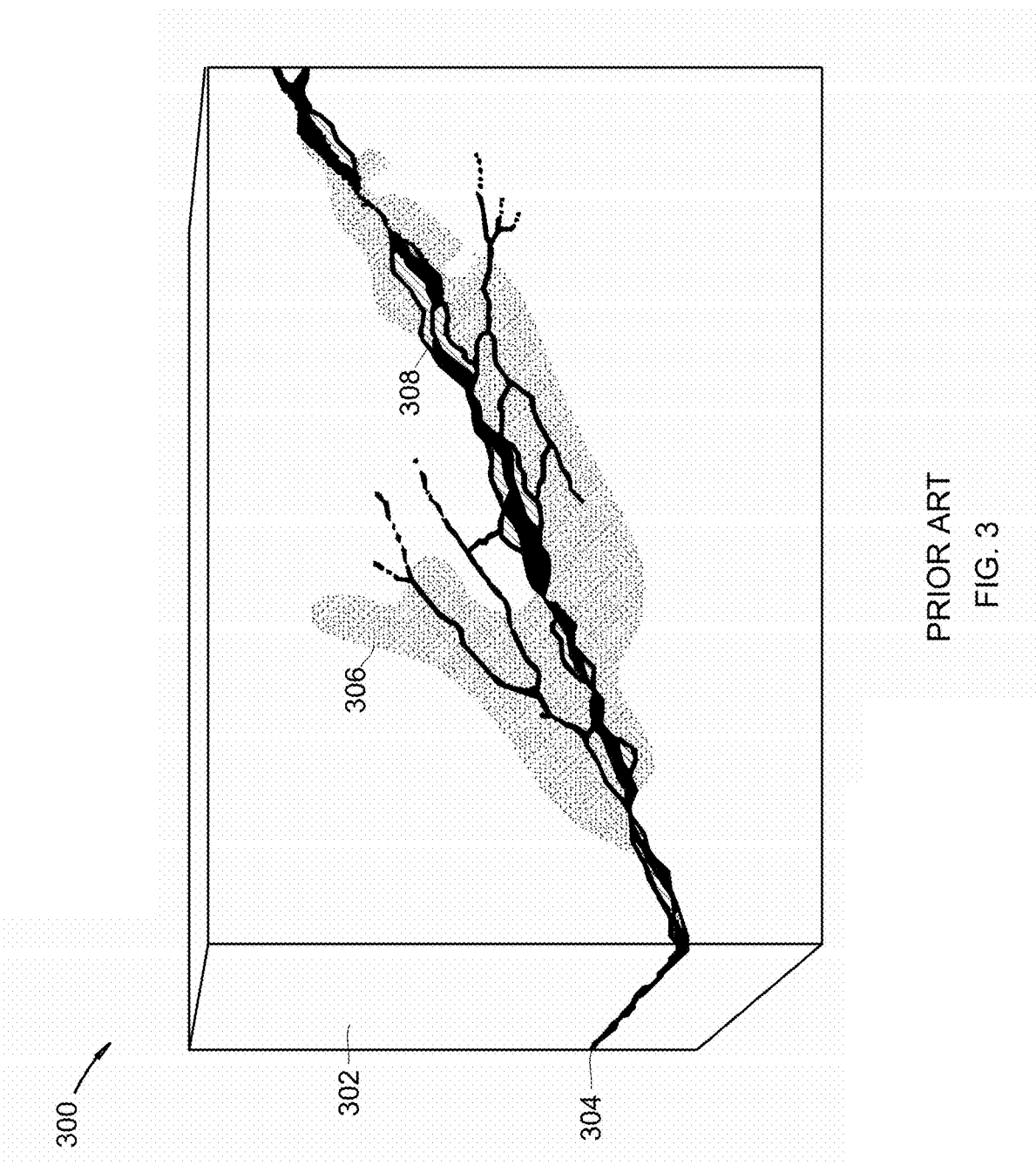
FIG. 3 shows a fractured reservoir, as per the Prior Art.

Referring to FIG. 3, a fractured reservoir is shown at 300, as per the Prior Art. Unfractured rock 302 surrounds fracture 304 and altered rock 306. Fracture 304 surrounds infilling minerals 308. Fractures 304 that contain residual hydrocarbons and water would be useable as a part of one embodiment of the present invention.

Figure 4:
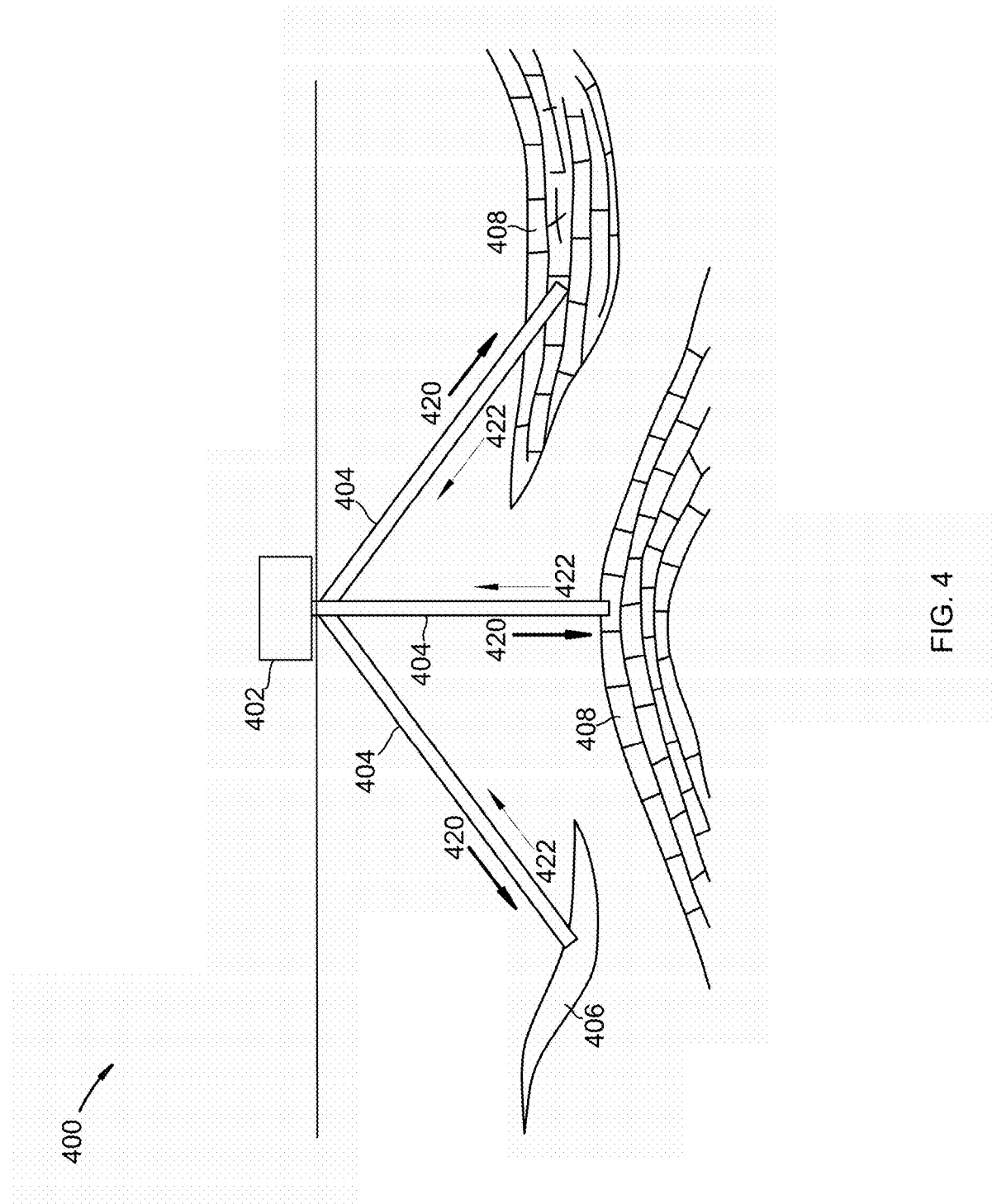
FIG. 4 shows a device for converting carbon dioxide into hydrocarbons.

Referring to FIG. 4, a device for converting carbon dioxide into hydrocarbons is shown at 400, as per one embodiment of the present invention. Injector-backflow system 402 connects to gas reservoir 406 and oil reservoirs 408 by pipelines 404. Gas reservoir 406 is partially produced. Oil reservoirs 408 are partially produced. Gas reservoir 406 and oil reservoirs 408 comprise residual hydrocarbons. Injector-backflow system 402 comprises a compressor and a valve. The compressor injects a catalyst-free feed stream into reservoirs 406 and 408 at an operating pressure, sequestering the feed stream in reservoirs 406 and 408. The valve, located after the compressor, prevents the feed stream from flowing out of reservoirs 406 and 408. The sequestered carbon dioxide reacts with water and at least a portion of the residual hydrocarbons over a time period to produce additional hydrocarbons. The water used in the reaction is already present in the reservoir, provided by the feed stream, or combinations thereof. The additional hydrocarbons are recovered after the time period.

Figure 5:
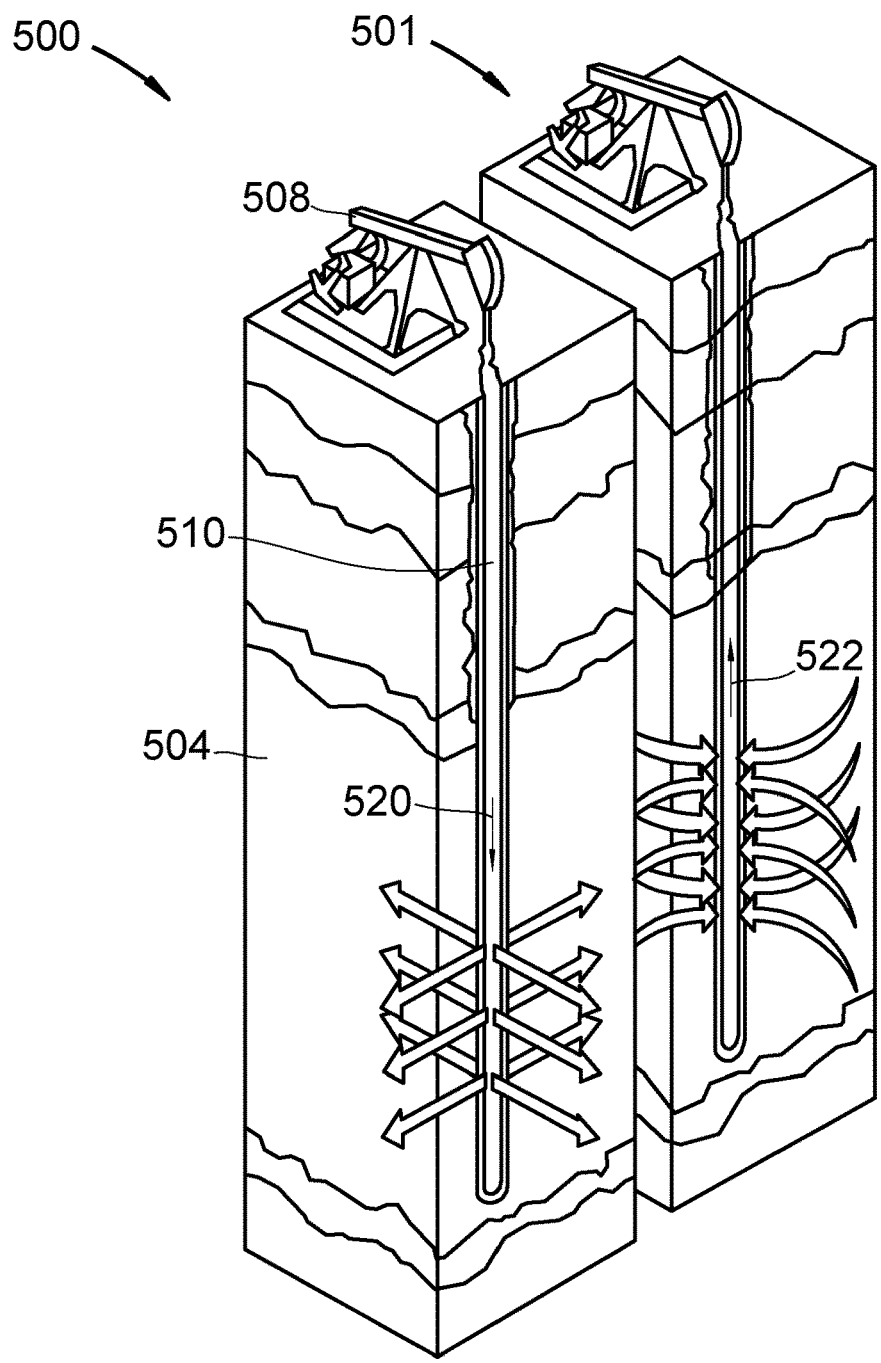
FIG. 5 shows a device for converting carbon dioxide into hydrocarbons.

Referring to FIG. 5, a device for converting carbon dioxide into hydrocarbons is shown at 500 and 501, as per one embodiment of the present invention. 500 shows the injection phase. 501 shows the removal phase. Injector-backflow-withdrawal system 508 connects to oil reservoir 504 by pipeline 510. Oil reservoir 504 is produced. Oil reservoir 504 comprises residual hydrocarbons. Injector-backflow-withdrawal system 508 comprises a compressor (not shown), a valve (not shown), and a pumpjack. During injection phase 500, the compressor injects catalyst-free feed stream 520 into reservoir 504 at an operating pressure, sequestering carbon dioxide in reservoir 504. The valve, located after the compressor, prevents feed stream 520 from flowing out of reservoir 504. The sequestered carbon dioxide reacts with water and at least a portion of the residual hydrocarbons over a time period to produce additional hydrocarbons. The water used in the reaction is already present in the reservoir, provided by feed stream 520, or combinations thereof. After the time period, during removal phase 501, the additional hydrocarbons are recovered.

Figure 6:
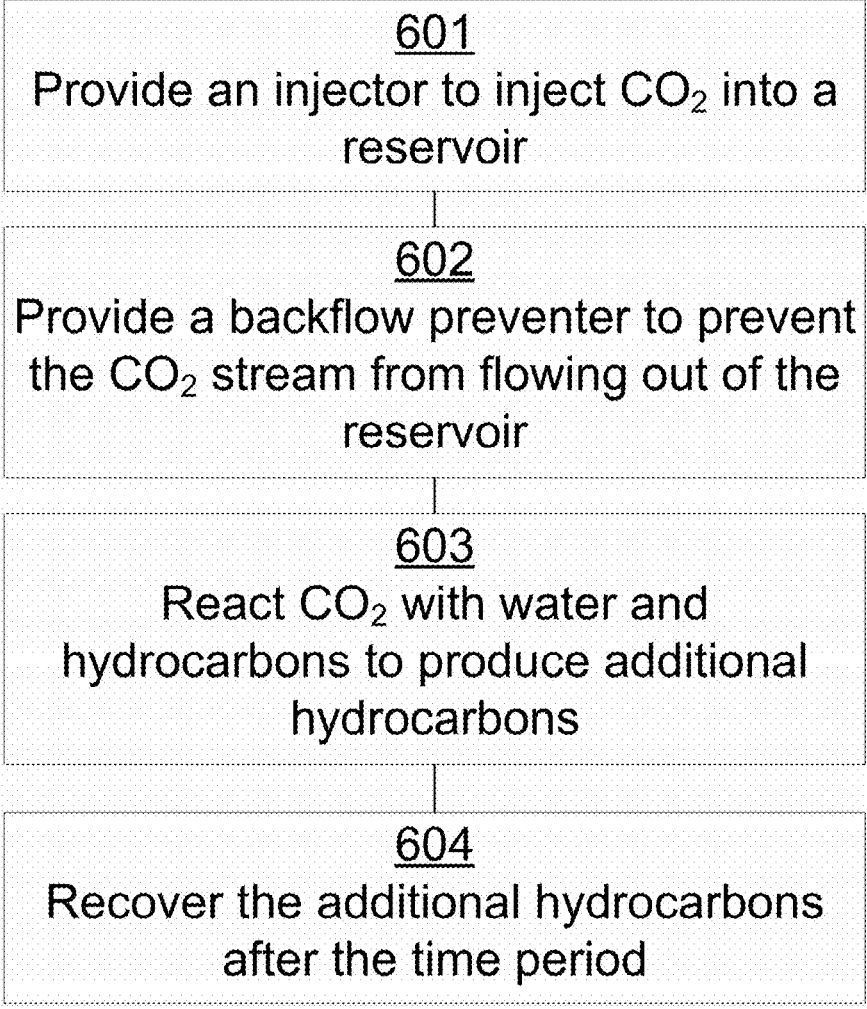
FIG. 6 shows a method for converting carbon dioxide into hydrocarbons.

Referring to FIG. 6, a method for converting carbon dioxide into hydrocarbons is shown at 600, as per one embodiment of the present invention. An injector system is provided which injects a catalyst-free feed stream into a reservoir at an operating pressure, sequestering carbon dioxide in the reservoir, wherein the reservoir comprises residual hydrocarbons 601. A backflow preventer is provided which prevents the feed stream from flowing out of the reservoir 602. The sequestered carbon dioxide reacts with water and at least a portion of the residual hydrocarbons over a time period to produce additional hydrocarbons 603. The water used in the reaction is already present in the reservoir, provided by the feed stream, or combinations thereof. The additional hydrocarbons are recovered after the time period 604.

In some embodiments, the carbon dioxide source comprises a tank, a pipeline, a carbon dioxide capture facility, or combinations thereof.

In some embodiments, the injector comprises a pump, a compressor, a pressurized pipeline, or combinations thereof.

In some embodiments, the backflow preventer comprises a valve, a pump, a cap, a plug, or combinations thereof.

In some embodiments, the time period comprises at least 5 years. In other embodiments, the time period comprises more than 80 years.

In some embodiments, the operating pressure is maintained periodically over the time period by further injecting the feed stream into the reservoir.

In some embodiments, the operating pressure comprises a range between 200 bar and 600 bar and an operating temperature of the reservoir comprises a range between 30 C and 100 C.

In some embodiments, heat required for reaction is provided by geothermal heating, combusting at least a portion of the residual hydrocarbons with oxygen added to the feed stream, preheating the feed stream, or combinations thereof.

In some embodiments, the feed stream further comprises oxygen.

In some embodiments, the hydrocarbons comprise alkanes, cycloalkanes, alkenes, alkynes, aromatics, asphaltenes, other organic compounds, or combinations thereof.

The invention claimed is:

1. A carbon dioxide to hydrocarbon conversion device comprising:
   a partially produced hydrocarbon subterranean reservoir, the reservoir comprising residual hydrocarbons;
   a carbon dioxide source positioned on a surface proximate to the reservoir;
   a surface mounted high-pressure fluid injector system connecting the carbon dioxide source and the reservoir; and,
   a backflow preventer disposed in-line between the surface mounted high-pressure fluid injector system and the reservoir, wherein:
   the injector system injects a feed stream, comprising the carbon dioxide, into the reservoir up to an operating pressure, the backflow preventer maintaining the operating pressure in the reservoir and sequestering the feed stream in the reservoir;

the sequestered carbon dioxide reacts with water and at least a portion of the residual hydrocarbons over a time period of at least 5 years to produce additional hydrocarbons, the water being present in the reservoir, provided by the feed stream, or combinations thereof; and, recovering the additional hydrocarbons after the time period.

2. The device of claim 1, wherein the surface mounted high-pressure fluid injector system comprises a pump, a compressor, a pressurized pipeline, or combinations thereof.

3. The device of claim 1, wherein the backflow preventer comprises a valve, a pump, a plug, or combinations thereof.

4. The device of claim 1, wherein the operating pressure is maintained periodically over the time period by further injecting the feed stream into the reservoir.

5. The device of claim 1, wherein the operating pressure comprises a range between 200 bar and 600 bar and an operating temperature of the reservoir comprises a range exceeding 30° C.

6. The device of claim 1, wherein heat required for reaction is provided by geothermal heating, combusting at least a portion of the residual hydrocarbons with oxygen added to the feed stream, preheating the feed stream, or combinations thereof.

7. The device of claim 1, wherein the feed stream further comprises oxygen.

8. The device of claim 1, wherein the residual hydrocarbons comprise alkanes, cycloalkanes, alkenes, alkynes, aromatics, asphaltenes, other organic compounds, or combinations thereof.

9. The device of claim 1, wherein the reservoir is at least partially fractured, is fractured by the operating pressure, or combinations thereof.

10. A method for converting carbon dioxide into hydrocarbons comprising:

providing a hydrocarbon subterranean reservoir;

providing a carbon dioxide source positioned on a surface proximate to the reservoir;

providing a surface mounted high-pressure fluid injector system which injects a feed stream, comprising carbon dioxide, into the reservoir at an operating pressure, wherein the reservoir comprises residual hydrocarbons;

providing a backflow preventer disposed in-line between the surface mounted high-pressure fluid injector system and the reservoir, the backflow preventer maintaining the operating pressure in the reservoir and sequestering the feed stream;

reacting the sequestered carbon dioxide with water and at least a portion of the residual hydrocarbons over a time period of at least 5 years to produce additional hydrocarbons, the water being present in the reservoir, provided by the feed stream, or combinations thereof; and, recovering the additional hydrocarbons after the time period.

11. The method of claim 10, wherein the surface mounted high-pressure fluid injector system comprises a pump, a compressor, a pressurized pipeline, or combinations thereof.

12. The method of claim 10, wherein the backflow preventer comprises a valve, a pump, a cap, a plug, or combinations thereof.

13. The method of claim 10, wherein the operating pressure is maintained periodically over the time period by further injecting the feed stream into the reservoir.

14. The method of claim 10, wherein the operating pressure comprises a range between 200 bar and 600 bar and an operating temperature of the reservoir comprises a range exceeds 30° C.

15. The method of claim 10, further comprising providing heat required for reaction by geothermal heating, combusting at least a portion of the residual hydrocarbons with oxygen added to the feed stream, preheating the feed stream, or combinations thereof.

16. The method of claim 10, wherein the feed stream further comprises oxygen.

17. The method of claim 10, wherein the residual hydrocarbons comprise alkanes, cycloalkanes, alkenes, alkynes, aromatics, asphaltenes, other organic compounds, or combinations thereof.

18. The method of claim 10, further comprising the reservoir being produced, at least partially fractured, being fractured by the operating pressure, or combinations thereof.

19. A method for converting carbon dioxide into hydrocarbons comprising:

providing a hydrocarbon subterranean reservoir;

providing a carbon dioxide source positioned on a surface proximate to the reservoir;

providing a surface mounted high-pressure fluid injector system which injects a feed stream, comprising carbon dioxide, into the reservoir at an operating pressure, wherein the reservoir comprises residual hydrocarbons;

providing a backflow preventer disposed in-line between the surface mounted high-pressure fluid injector system and the reservoir, the backflow preventer maintaining the operating pressure in the reservoir and sequestering the feed stream;

reacting the sequestered carbon dioxide with water and at least a portion of the residual hydrocarbons over a time period to produce additional hydrocarbons, the water being present in the reservoir and provided by the feed stream; and, recovering the additional hydrocarbons after the time period.

* * * * *